(12) United States Patent
Sudoh

(10) Patent No.: US 9,690,072 B2
(45) Date of Patent: Jun. 27, 2017

(54) IMAGE FORMING LENS AND IMAGE CAPTURING DEVICE

(71) Applicant: Yoshifumi Sudoh, Saitama (JP)

(72) Inventor: Yoshifumi Sudoh, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/818,474

(22) Filed: Aug. 5, 2015

(65) Prior Publication Data

US 2016/0077308 A1 Mar. 17, 2016

(30) Foreign Application Priority Data

Sep. 17, 2014 (JP) ................. 2014-189375

(51) Int. Cl.
*G02B 9/64* (2006.01)
*G02B 15/14* (2006.01)

(52) U.S. Cl.
CPC ............... *G02B 9/64* (2013.01); *G02B 15/14* (2013.01)

(58) Field of Classification Search
CPC . G02B 9/64; G02B 9/62; G02B 15/14; G02B 15/16
USPC .................................................. 359/754–756
See application file for complete search history.

(56) References Cited

U.S. PATENT DOCUMENTS

| 2009/0067060 | A1 | 3/2009 | Sudoh |
| 2009/0122418 | A1 | 5/2009 | Atsuumi et al. |
| 2009/0135500 | A1 | 5/2009 | Sudoh et al. |
| 2009/0147375 | A1 | 6/2009 | Sudoh et al. |
| 2009/0153980 | A1* | 6/2009 | Yamamoto ............. G02B 13/02 359/693 |
| 2009/0323200 | A1 | 12/2009 | Sudoh |
| 2010/0027136 | A1 | 2/2010 | Ohashi et al. |
| 2010/0296180 | A1 | 11/2010 | Sudoh et al. |
| 2011/0043927 | A1 | 2/2011 | Sudoh |
| 2011/0051260 | A1 | 3/2011 | Nakayama et al. |
| 2011/0069402 | A1 | 3/2011 | Sudoh |

(Continued)

FOREIGN PATENT DOCUMENTS

| JP | 8-015609 | 1/1996 |
| JP | 2005-189727 | 7/2005 |

(Continued)

OTHER PUBLICATIONS

U.S. Appl. No. 14/617,118, filed Feb. 9, 2015.
U.S. Appl. No. 14/584,167, filed Dec. 29, 2014.
U.S. Appl. No. 14/572,973, filed Dec. 17, 2014.

*Primary Examiner* — Jordan Schwartz
(74) *Attorney, Agent, or Firm* — Oblon, McClelland, Maier & Neustadt, L.L.P.

(57) ABSTRACT

An image forming lens is formed by sequentially arranging, from an object side to an image side, a first lens group having positive power, an aperture stop, a second lens group having positive power, and a third lens group having positive power. The image forming lens satisfies following conditional expressions:

$0.95 < f12/f < 1.2,$ $0.0 < f/f3 < 0.2,$ $-0.5 < (R142+R211)/(R142-R211) < -0.2,$ where f is a focal length of an entire system, f12 is a composite focal length of the first lens group and the second lens group, f3 is a focal length of the third lens group, R142 is a curvature radius of an image-side surface of the negative lens closest to the image side in the first lens group, and R211 is a curvature radius of object-side surface of the negative lens closest to the object side in the second lens group.

9 Claims, 9 Drawing Sheets

(56) References Cited

U.S. PATENT DOCUMENTS

| | | |
|---|---|---|
| 2011/0222169 A1 | 9/2011 | Sudoh |
| 2011/0228408 A1 | 9/2011 | Sudoh |
| 2012/0127586 A1 | 5/2012 | Sudoh |
| 2013/0222925 A1* | 8/2013 | Onozaki ............ G02B 13/0055 359/692 |
| 2014/0293457 A1 | 10/2014 | Sudoh |
| 2015/0043087 A1 | 2/2015 | Sudoh |
| 2015/0070780 A1 | 3/2015 | Sudoh |
| 2015/0130961 A1 | 5/2015 | Sudoh |
| 2016/0131878 A1* | 5/2016 | Nomura ................ G02B 13/24 359/740 |

FOREIGN PATENT DOCUMENTS

| | | |
|---|---|---|
| JP | 2008-020656 | 1/2008 |
| JP | 2014-197148 | 10/2014 |

* cited by examiner

IMAGE FORMING LENS AND IMAGE CAPTURING DEVICE

CROSS-REFERENCE TO RELATED APPLICATIONS

This patent application is based on and claims priority pursuant to 35 U.S.C. §119(a) to Japanese Patent Application No. 2014-189375, filed on Sep. 17, 2014, in the Japan Patent Office, the entire disclosure of which is hereby incorporated by reference herein.

BACKGROUND

Technical Field

The present invention relates to an image forming lens and an image capturing device.

Description of the Related Art

A so-called "industrial camera" is widely put into practical use, and for example, an image input device for machine vision, etc. are developed.

In an image forming lens used in the image input device for machine vision, it is important to have stable lens performance with little variation due to focusing.

There is a known technology disclosed in JP-2013-218015-A as an optical system in which lens performance is suppressed from being varied due to focusing.

The optical system (lens system) disclosed in JP-2013-218015-A includes a first lens unit having positive power and a second lens unit having positive or negative power.

Further, the first lens unit is formed by sequentially arranging, from an object side to an image side, a lens unit 1a having positive power, an aperture stop, and a lens unit 1b having positive power, and focusing from an infinite distance object to a short distance object is performed by moving the first lens unit to the object side.

SUMMARY

An image forming lens is formed by sequentially arranging, from an object side to an image side, a first lens group having positive power, an aperture stop, a second lens group having positive power, and a third lens group having positive power, and focusing from an infinite distance object to a short distance object is performed by integrally moving the first lens group and the second lens group to the object side so as to increase a distance between the second lens group and the third lens group. In the image forming device, the first lens group is formed of by sequentially arranging four lenses from the object side to the image side in order of a negative lens, a positive lens, a positive lens, and a negative lens having a concave surface on the image side. The second lens group is formed by sequentially arranging three lenses from the object side to the image side in order of a negative lens having a concave surface on the object side, a positive lens, and a positive lens. The third lens group is formed by sequentially arranging two lenses from the object side to the image side in order of a negative lens and a positive lens. The image forming lens satisfies following conditional expressions:

$$0.95 < f12/f < 1.2 \quad (1),$$

$$0.0 < f/f3 < 0.2 \quad (2), \text{ and}$$

$$-0.5 < (R142 + R211)/(R142 - R211) < -0.2 \quad (3),$$

where f is a focal length of an entire system, f12 is a composite focal length of the first lens group and the second lens group, f3 is a focal length of the third lens group, R142 is a curvature radius of an image-side surface of the negative lens closest to the image side in the first lens group, and R211 is a curvature radius of object-side surface of the negative lens closest to the object side in the second lens group.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
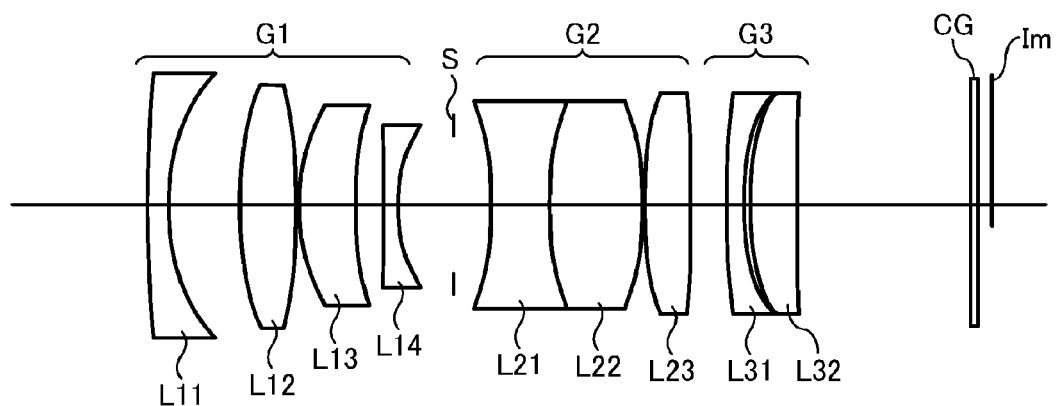
FIG. 1 is a diagram illustrating an image forming lens according to a first example.
Figure 2:
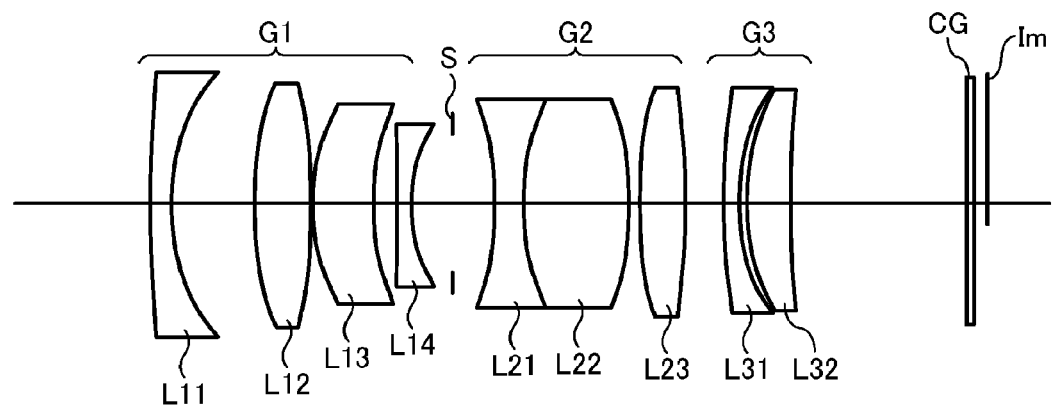
FIG. 2 is a diagram illustrating an image forming lens according to a second example.
Figure 3:
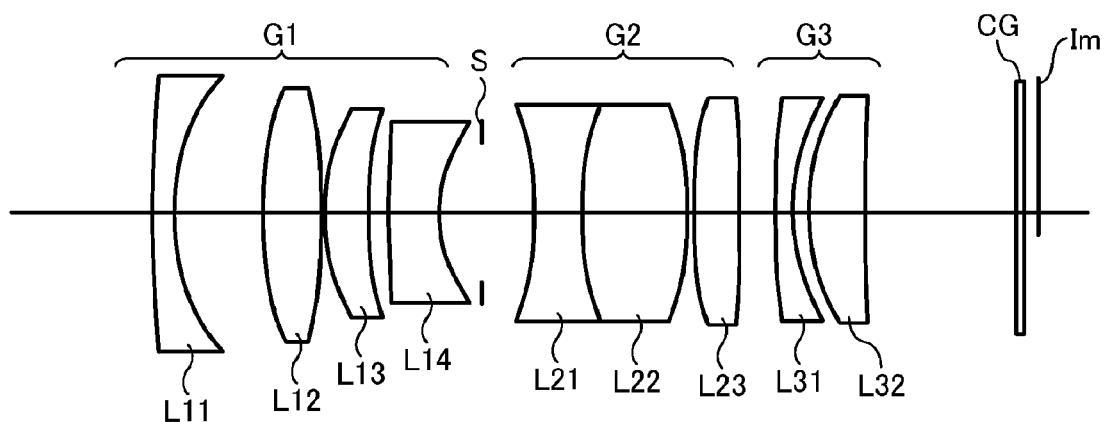
FIG. 3 is a diagram illustrating an image forming lens according to a third example.
Figure 4:
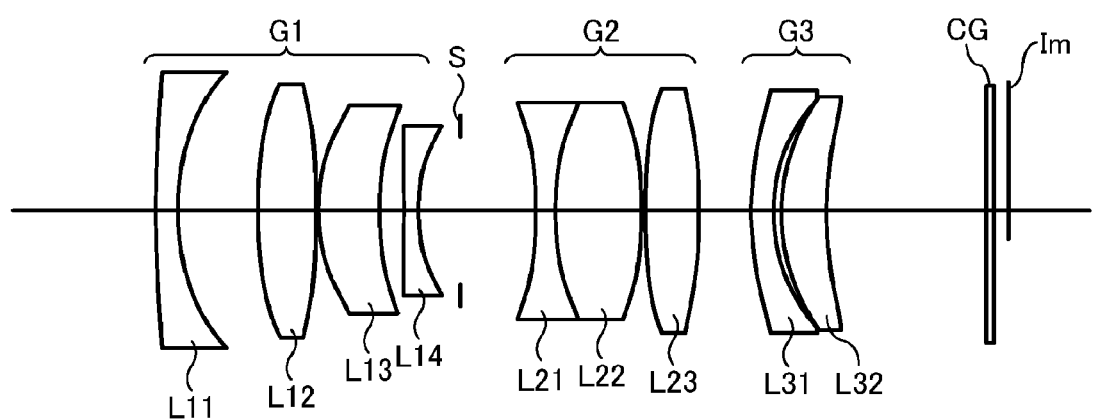
FIG. 4 is a diagram illustrating an image forming lens according to a fourth example.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

FIGS. 1 to 4 illustrate four working examples of an image forming lenses. These working examples correspond to concrete first to fourth examples described later in this order.

In FIGS. 1 to 4, a left side of the drawing is defined as an "object side", and a right side of the drawing is defined as an "image side".

FIGS. 1 to 4 are diagrams illustrating lens configurations in a state that an image forming lens is "focused on infinity". Note that same reference signs are used in FIGS. 1 to 4 to avoid complication.

In FIGS. 1 to 4, a reference sign G1 indicates a "first lens group", a reference sign G2 a "second lens group", a reference sign G3 a "third lens group", and a reference sign S an "aperture stop" respectively.

Further, a reference sign Im indicates an "image surface".

The image forming lenses according to these working examples are assumed to be used in the case of "capturing an image of a formed image with an image sensor", and a reference sign CG indicates a "cover glass of the image sensor" in FIGS. 1 to 4.

The cover glass CG is formed like a "parallel flat plate", and a light receiving surface of the image sensor coincides with the image surface Im.

The cover glass CG has a function to shield and protect the light receiving surface of the image sensor, and further can have various kinds of filtering functions such as an infrared cut filter.

The first lens group G1 to the third lens group to G3 all have "positive power".

Focusing is performed from an infinite distance object to a short distance object by integrally moving the first lens group G1 and the second lens group G2 to the object side so as to increase a distance between the second lens group G2 and the third lens group G3.

At the time of performing the mentioned focusing, the aperture stop S may be moved integrally with the first lens group G1 and the second lens group G2, may be moved separately from the first lens group G1 and the second lens group G2, or may be fixed relative to the image surface Im.

The first lens group G1 having positive power is formed by sequentially arranging, from the object side to the image side, a negative lens L11, a positive lens L12, a positive lens L13, and a negative lens L14.

The negative lens L14 has a "concave surface on the image side".

The second lens group G2 having positive power is formed by sequentially arranging, from the object side to the image side, a negative lens L21, a positive lens L22, and a positive lens L23.

The negative lens L21 has a "concave surface on the object side".

Therefore, the aperture stop S is interposed between the image-side concave surface of the negative lens L14 and the object-side concave surface of the negative lens L21.

The third lens group G3 is formed by sequentially arranging a negative lens L31 and a positive lens L32 from the object side to the image side.

More specifically, the image forming lens according to the working examples illustrated in FIGS. 1 to 4 is formed by sequentially arranging, from the object side to the image side, the first lens group G1 having positive power, the aperture stop S, the second lens group G2 having positive power, and the third lens group G3 having positive power.

Further, focusing from the infinite distance object to the short distance object is performed by integrally moving the first lens group G1 and the second lens group G2 to the object side and increasing the distance between the second lens group G2 and the third lens group G3.

The first lens group G1 is formed by sequentially arranging four lenses from the object side to the image side in order of the negative lens L11, positive lens L12, positive lens L13, and negative lens L14 having the concave surface on the image side.

The second lens group G2 is formed by sequentially arranging the three lenses from the object side to the image side in order of the negative lens L21 having the concave surface on the object side, positive lens L22, and positive lens L23. The third lens group G3 is formed by sequentially arranging two lenses from the object side to the image side in order of the negative lens L31 and positive lens L32.

The image forming lens of the present invention satisfies conditional expressions (1), (2), and (3).

When a parameter of the conditional expression (1) is 1.2 or more, combined power of the first lens group and the second lens group which are integrally moved at the time of performing focusing from the infinite distance object to the short distance object is relatively small with respect to power in an entire system.

Therefore, a "moving amount of the first lens group/the second lens group" due to the mentioned focusing is increased, and it becomes difficult to suppress "lens performance from being varied due to focusing".

Further, when the parameter of the conditional expression (1) is 0.95 or less, the "combined power (positive power) of the first lens group/second lens group" becomes excessively large, an aberration tends to be generated at the first lens group and second lens group, and the generated aberration is further magnified by the positive power of the third lens group.

Therefore, correcting the aberration in a favorable manner as a whole is not easy, and favorably suppressing the aberration from being changed due to focusing is difficult even though correction is made.

By satisfying the conditional expression (1), the aberration can be easily suppressed from being changed due to focusing while keeping good performance of the image forming lens.

The conditional expression (2) is to balance the power of the entire system and the power of the third lens group.

The third lens group takes a role to reduce an incidence angle of an off-axis light beam to the image surface and further a role to correct a residual aberration generated at the first and second lens groups.

When the parameter of the conditional expression (2) is out of a range of the conditional expression (2), the third lens group can hardly "perform the role to correct the residual aberration generated at the first and second lens groups in a favorable manner while reducing the incidence angle of the off-axis light beam to the image surface".

By satisfying the conditional expression (2), the above-described roles of the third lens group can be effectively performed.

According to the image forming lens of the present invention, the first lens group and the second lens group are nearly symmetrical around the aperture stop, and front and an almost "Gaussian type" arrangement is formed in front and rear portions of the aperture stop.

In this arrangement, appropriate power distribution is important between an "image-side surface of the negative lens on the image side in the first lens group" located closest to the aperture stop and an "object-side surface of the negative lens located closest to the object side in the second lens group".

The conditional expression (3) is to achieve such "appropriate power distribution".

When a parameter of the conditional expression (3) is 0.2 or more, curvature of the object-side surface of the negative lens in the second lens group becomes excessively small. In the case where the parameter is 0.5 or less, the curvature of the image-side surface of negative lens on the image side in the first lens group becomes excessively small. In either case, performing favorable correction for the aberration in the entire system of the image forming lens is difficult.

By satisfying the conditional expression (3), power distribution is appropriately made between the "object-side concave surface and the image-side concave surface" interposing the aperture stop.

As described above, according to the image forming lens of the present invention, focusing from the infinite distance object to the short distance object is performed by integrally moving the first lens group and the second lens group to the object side and increasing the distance between the second lens group and the third lens group.

The third lens group can be also moved at the time of focusing so as to "increase the distance between the second lens group and the third lens group".

However, the third lens group may also be fixed relative to the image surface at the time of focusing from the infinite distance object to the short distance object.

Since the first lens group and the second lens group are integrally moved to the object side at the time of focusing from the infinite distance object to the short distance object, "the distance between the second lens group and the third lens group" is increased even when the third lens group is fixed relative to the image surface.

When the third lens group is fixed relative to the image surface at the time of focusing, a mechanism to perform focusing is simplified. Such a "simplified mechanism to perform focusing" brings an effect of downsizing the image forming lens.

In the above-described configuration, preferably, the image forming lens of the present invention satisfies any one or more of following conditional expressions (4) to (9) in addition to the conditional expressions (1), (2), (3):

$$-0.2 < (R312 - R321)/(R312 + R321) < -0.05 \quad (4),$$

$$0.20 < Da/D1 < 0.40 \quad (5),$$

$$-2.0 < f1\_1/f1\_2 < -1.0 \quad (6),$$

$$0.3 < f1\_2/f1\_3 < 0.7 \quad (7),$$

$$0.1 < (R131 - R142)/(R131 + R142) < 0.2 \quad (8), \text{ and}$$

$$0.1 < f2/f1 < 0.3 \quad (9).$$

The signs in respective parameters of the conditional expressions (4) to (9) are defined as follows.

In the case where the image-side surface of the negative lens (negative lens L31 in FIGS. 1 to 4) is a concave surface and the object-side surface of the positive lens (positive lens L32 in FIGS. 1 to 4) is a convex surface in the third lens group, "R312" is a curvature radius of the image-side surface (>0), and "R321" is a curvature radius of the object-side surface (>0).

"Da" is an air space between the object-side negative lens (negative lens L11 in FIGS. 1 to 4) and the object-side positive lens (positive lens L12 in FIGS. 1 to 4) in the first lens group.

"D1" is a distance from a lens surface closest to the object side to a lens surface closest to the image side in the first lens group. This distance D1 is also referred to as a "thickness of the first lens group".

"f1_1" is a focal length of the object-side negative lens in the first lens group (negative lens L11 in FIGS. 1 to 4), and "f1_2" is a focal length of the object-side positive lens in the first lens group (positive lens L12 in FIGS. 1 to 4).

"f1_3" is a focal length of the image-side positive lens in the first lens group (positive lens L13 in FIGS. 1 to 4).

"R131" is a curvature radius of the object-side surface of the image-side positive lens in the first lens group (positive lens L13 in FIGS. 1 to 4), and "R142" is a curvature radius of the image-side surface of the image-side negative lens in the first lens group (negative lens L14 in FIGS. 1 to 4).

"f1" is a focal length of the first lens group, and "f2" is a focal length of the second lens group.

When a parameter of the conditional expression (4) is −0.05 or more, the curvature radius of the object-side surface of the positive lens in the third lens group becomes excessively small, and balancing correction for the aberration becomes difficult in the entire system of the image forming lens.

When the parameter of the conditional expression (4) is −0.2 or less, the curvature radius of the image-side surface of the negative lens in the third lens group becomes excessively small, and correction for the aberration is hardly balanced in the entire system of the image forming lens.

"The role to reduce the incidence angle of the off-axis light beam to the image surface and the role to correct the residual aberration generated at the first and second lens groups" to be performed by the third lens group are effectively performed by satisfying the conditional expression (4).

The negative lens (negative lens L11 in FIGS. 1 to 4) and the positive lens (positive lens L12 in FIGS. 1 to 4) on the object side in the first lens group exchange a spherical aberration and a coma aberration, thereby contributing to correcting the aberration in the entire system.

The conditional expression (5) is a condition to effectively perform a following function to be performed by the "negative lens and positive lens" on the object side in the first lens group.

When a parameter of the conditional expression (5) is 0.40 or more, a distance occupied by the object-side "negative lens and positive lens" in the first lens group becomes relatively large, and a distance occupied by the image-side positive lens and negative lens in the first lens group becomes excessively small. As a result, an aberration that is hardly corrected tends to be generated in the entire system of the image forming lens.

When the parameter of the conditional expression (5) is 0.20 or less, the distance occupied by the object-side "negative lens and positive lens" in the first lens group becomes relatively excessively small, and "aberration exchange between these negative lens and positive lens becomes excessively increased". As a result, the aberration that is hardly corrected tends to be generated in the entire system of the image forming lens.

The conditional expression (6) relates to power balance between the object-side negative lens (negative lens L11 in FIGS. 1 to 4) and the object-side positive lens (positive lens L12 in FIGS. 1 to 4) in the first lens group.

The object-side negative lens and positive lens in the first lens group contribute to correcting the aberration in the entire system by exchanging the spherical aberration and the coma aberration.

When the parameter of the conditional expression (6) is −0.1 or more, the focal length of the object-side negative lens becomes "relatively excessively small in an absolute value" with respect to the focal length of the object-side positive lens.

This causes imbalance of correction for the aberration in these negative lens/positive lens, and the aberration that is hardly corrected tends to be generated in the entire system of the image forming lens.

When the parameter of the conditional expression (6) is −0.2 or less, the focal length of the object-side positive lens becomes "relatively excessively small in an absolute value" with respect to the focal length of the object-side negative lens.

This causes imbalance of correction for the aberration in these negative lens/positive lens, and the aberration that is hardly corrected tends to be generated in the entire system of the image forming lens.

The conditional expression (7) relates to the power balance between the object-side positive lens (positive lens L12 in FIGS. 1 to 4) and the image-side positive lens (positive lens L13 in FIGS. 1 to 4) in the first lens group.

The object-side positive lens and the image-side positive lens in the first lens group contribute to correcting the aberration by distributing positive power in the first lens group, and make a significant contribution to providing high performance as well as an enlarged aperture.

When the parameter of the conditional expression (7) is 0.7 or more, the power of the image-side positive lens becomes excessively large with respect to the power of the object-side positive lens in the first lens group, and the aberration that is hardly corrected tends to be generated in the entire system of the image forming lens.

When the parameter of the conditional expression (7) is 0.3 or less, the power of the object-side positive lens becomes excessively large with respect to the power of the image-side positive lens in the first lens group, and the aberration that is hardly corrected tends to be generated in the entire system of the image forming lens.

The conditional expression (8) relates to the power balance between the object-side surface of the image-side positive lens (positive lens L13 in FIGS. 1 to 4) and the image-side surface of the image-side negative lens (negative lens L14 in FIGS. 1 to 4) in the first lens group.

These lenses surfaces also contribute to correcting the aberration in the entire system by exchanging the aberration.

When a parameter of the conditional expression (8) is 0.2 or more, negative power of the image-side surface (concave surface) of the image-side negative lens becomes excessively large with respect to positive power of the object-side surface of the image-side positive lens. Further, in the case of 0.1 or less, the negative power of the image-side surface of the image-side negative lens becomes excessively small with respect to the positive power of the object-side surface of the image-side positive lens.

Therefore, when the parameter is out of a range of the conditional expression (8), contribution to correcting the aberration in the entire system becomes difficult.

The conditional expression (9) is to appropriately distribute the positive power of the first and second lens groups that are integrally moved at the time of focusing.

When the parameter of the conditional expression (9) is 0.3 or more, the power of the first lens group becomes relatively large with respect to the power of the second lens group, and in the case of 0.1 or less, the power of the second lens group becomes relatively large with respect to the power of the first lens group.

When the parameter is out of a range of the conditional expression (9), the aberration that is hardly corrected tends to be generated in the entire system of the image forming lens.

The image forming lens of the present invention may, of course, adopt one or more of special surfaces such as an aspheric surface and a diffractive surface, but all of the lens surfaces may be formed of spherical surfaces as well.

When the special surfaces such as the aspheric surface and the diffractive surface are not adopted, "high manufacturing cost" spent for a die for molding can be saved, for example, and particularly, it is economically advantageous at the time of small-lot production.

Further, preferably, all of the lenses constituting the image forming lens are made of "inorganic solid material" respectively. The lens made of organic material, "organic-inorganic hybrid material", etc. has a property largely varied by environmental conditions such as temperature and humidity.

When all of the lenses constituting the image forming lens are made of the "inorganic solid material", the image forming lens hardly receiving influence from change of the environmental conditions such as temperature and humidity.

In the following, the first to fourth examples will be described as concrete examples of the image forming lenses according to the working examples illustrated in FIGS. 1 to 4.

The image forming lenses in the first to fourth examples are assumed to be used in an image input device for machine vision, and are almost telescopic lenses in which a working distance can be easily secured and perspective influence is hardly received.

The mentioned "working distance" is an operating distance and is a distance between an end of the lens and an object surface of a target to be imaged for image inputting (also referred to as a "work").

As illustrated in FIGS. 1 to 4 in which same reference signs are used, the image forming lens is formed by sequentially arranging, from the object side to the image side, the first lens group G1, aperture stop S, second lens group G2, and third lens group G3.

The first lens group G1 is formed by sequentially arranging the four lenses from the object side to the image side in order of the negative lens L11, positive lens L12, positive lens L13, and negative lens L14.

The second lens group G2 arranged "immediately on the image side" of the aperture stop S is formed by sequentially arranging the three lenses from the object side to the image side in order of the negative lens L21, positive lens L22, and positive lens L23.

In the first to fourth examples, the negative lens L21 and the positive lens L22 are cemented.

The third lens group G3 is formed by sequentially arranging the two lenses from the object side to the image side in order of the negative lens L31 and positive lens L32.

In all of the first to fourth examples, the image forming lenses are formed of nine lenses, and all of these nine lenses are "spherical lenses" and made of "inorganic solid material".

In all of the first to fourth examples, a "maximum image height is 8.0 mm".

In the respective examples, the cover glass CG having the form of the parallel flat plate disposed on the image surface side of the second lens group G2 is arranged such that an image-side surface thereof is located at a position about 1.0 mm from the image surface Im on the object side, but not limited thereto, of course.

The reference signs in the respective examples are defined as follows.

f: focal length in entire system (focal length in a state that focusing is performed on an infinite distance object)

F: F number $2\omega$: field angle (field angle in a state that focusing is performed on infinity)

R: curvature radius

D: distance between surfaces

N: refractive index ("$n_d$" in the above description)

$\nu$: Abbe's number ("$\nu_d$" in the above description)

$\phi$: effective diameter of light beam

The unit of a length dimension is "mm", unless otherwise specifically noted.

The first example described first is a concrete example of the image forming lens illustrated in FIG. 1.

First Example f=25.00, F=1.81, 2ω=35.5 degrees

Data of the first example is shown in TABLE 1.

TABLE 1

| | R | D | N | ν | φ | GLASS |
|---|---|---|---|---|---|---|
| 1 | 124.713 | 1.40 | 1.62004 | 36.26 | 20.5 | S-TIM2(OHARA) |
| 2 | 18.531 | 5.11 | | | 18.9 | |
| 3 | 27.570 | 4.43 | 1.83481 | 42.72 | 18.8 | S-LAH55V(OHARA) |
| 4 | −49.616 | 0.20 | | | 18.2 | |
| 5 | 18.490 | 4.08 | 1.83481 | 42.72 | 15.2 | S-LAH55V(OHARA) |
| 6 | 28.936 | 1.98 | | | 13.2 | |
| 7 | −150.973 | 1.25 | 1.62004 | 36.26 | 12.3 | S-TIM2(OHARA) |
| 8 | 13.827 | 4.00 | | | 11.4 | |
| 9 | 0.000 | 2.66 | | | 11.1 | |
| 10 | −31.113 | 4.24 | 1.80518 | 25.42 | 11.8 | S-TIH6(OHARA) |
| 11 | 25.503 | 6.93 | 1.80400 | 46.58 | 14.0 | S-LAH65V(OHARA) |
| 12 | −25.503 | 0.20 | | | 15.8 | |
| 13 | 37.602 | 3.34 | 1.80400 | 46.58 | 17.0 | S-LAH65V(OHARA) |
| 14 | −129.435 | D14 | | | 17.1 | |

TABLE 1-continued

| | R | D | N | ν | φ | GLASS |
|---|---|---|---|---|---|---|
| 15 | 70.773 | 1.25 | 1.64769 | 33.79 | 17.1 | S-TIM22(OHARA) |
| 16 | 18.143 | 0.60 | | | 16.8 | |
| 17 | 22.865 | 3.37 | 1.80400 | 46.58 | 16.8 | S-LAH65V(OHARA) |
| 18 | 156.172 | 12.57 | | | 16.7 | |
| 19 | ∞ | 0.75 | 1.51633 | 64.14 | | Filter, etc |
| 20 | ∞ | 1.00 | | | | |

In TABLE 1, values in a left column are surface numbers counted from the object side, and the surface number 9 is a "surface of an aperture stop". The same is applied to second to fourth examples in the following.

<Variable Distance>

A variable distance is a distance varied at the time of focusing, and corresponds to "D14" in TABLE 1. Data of the variable distance is shown in TABLE 2.

TABLE 2

| | Inf. | ×0.10 | ×0.20 |
|---|---|---|---|
| D14 | 2.50000 | 5.36268 | 8.22537 |

In TABLE 2, "Inf.", "×0.10", and "×0.20" indicate that focusing is performed on an "object on infinity", an "object with imaging magnification of −0.1 times", and an "object with imaging magnification of −0.2 times" respectively. The same is applied to the following second to fourth examples.

<Parameter Values in Conditional Expressions>

The parameter values in the respective conditional expressions are shown in TABLE 3.

TABLE 3

| | |
|---|---|
| f12/f | 1.07 |
| f/f3 | 0.10 |
| (R142 + R211)/(R142 − R211) | −0.38 |
| (R312 − R321)/(R312 + R321) | −0.12 |
| Da/D1 | 0.28 |
| f1_1/f1_2 | −1.62 |
| f1_2/f1_3 | 0.42 |
| (R131 − R142)/(R131 + R142) | 0.14 |
| f2/f1 | 0.19 |

Second Example f=25.00, F=1.81, 2ω=35.5 degrees

Data of the second example is shown in TABLE 4.

TABLE 4

| | R | D | N | ν | φ | GLASS |
|---|---|---|---|---|---|---|
| 1 | 79.608 | 1.40 | 1.62004 | 36.26 | 20.9 | S-TIM2(OHARA) |
| 2 | 17.839 | 6.04 | | | 19.2 | |
| 3 | 27.398 | 4.36 | 1.83481 | 42.72 | 19.0 | S-LAH55V(OHARA) |
| 4 | −52.201 | 0.20 | | | 18.3 | |
| 5 | 17.177 | 4.52 | 1.83400 | 37.16 | 15.2 | S-LAH60(OHARA) |
| 6 | 24.578 | 1.59 | | | 12.9 | |
| 7 | 992.053 | 1.00 | 1.64769 | 33.79 | 12.3 | S-TIM22(OHARA) |
| 8 | 12.832 | 3.00 | | | 11.3 | |
| 9 | 0.000 | 3.50 | | | 11.1 | |
| 10 | −25.329 | 1.74 | 1.74077 | 27.79 | 11.9 | S-TIH13(OHARA) |
| 11 | 20.762 | 8.00 | 1.69680 | 55.53 | 13.3 | S-LAL14(OHARA) |
| 12 | −23.760 | 0.51 | | | 15.8 | |
| 13 | 38.272 | 3.59 | 1.78800 | 47.37 | 17.6 | S-LAH64(OHARA) |
| 14 | −68.615 | D14 | | | 17.8 | |
| 15 | 49.937 | 1.25 | 1.64769 | 33.79 | 17.6 | S-TIM22(OHARA) |
| 16 | 17.564 | 0.64 | | | 17.2 | |

TABLE 4-continued

| | R | D | N | ν | φ | GLASS |
|---|---|---|---|---|---|---|
| 17 | 22.309 | 3.36 | 1.78800 | 47.37 | 17.3 | S-LAH64(OHARA) |
| 18 | 120.682 | 12.55 | | | 17.1 | |
| 19 | ∞ | 0.75 | 1.51633 | 64.14 | | Filter, etc. |
| 20 | ∞ | 1.00 | | | | |

<Variable Distance>
Data of the variable distance is shown in TABLE 5.

TABLE 5

| | Inf. | ×0.10 | ×0.20 |
|---|---|---|---|
| D14 | 2.50000 | 5.55389 | 8.60778 |

<Parameter Values in Conditional Expressions>
The parameter values in the respective conditional expressions are shown in TABLE 6.

TABLE 6

| f12/f | 1.11 |
|---|---|
| f/f3 | 0.14 |
| (R142 + R211)/(R142 − R211) | −0.33 |
| (R312 − R321)/(R312 + R321) | −0.12 |
| Da/D1 | 0.32 |
| f1_1/f1_2 | −1.69 |
| f1_2/f1_3 | 0.41 |
| (R131 − R142)/(R131 + R142) | 0.14 |
| f2/f1 | 0.23 |

Third Example f=25.01, F=1.81, 2ω=35.5 degrees
Data of the third example is shown in TABLE 7.

TABLE 7

| | R | D | N | ν | φ | GLASS |
|---|---|---|---|---|---|---|
| 1 | 149.992 | 1.48 | 1.57501 | 41.50 | 21.1 | S-TIL27(OHARA) |
| 2 | 19.155 | 6.33 | | | 19.4 | |
| 3 | 31.756 | 4.34 | 1.83481 | 42.72 | 19.1 | S-LAH55V(OHARA) |
| 4 | −48.414 | 0.20 | | | 18.5 | |
| 5 | 17.517 | 3.08 | 1.83481 | 42.72 | 15.4 | S-LAH55V(OHARA) |
| 6 | 32.837 | 1.43 | | | 14.1 | |
| 7 | 233.630 | 3.55 | 1.68893 | 31.07 | 13.5 | S-TIM28(OHARA) |
| 8 | 12.615 | 3.00 | | | 11.3 | |
| 9 | 0.000 | 3.78 | | | 11.0 | |
| 10 | −27.147 | 3.30 | 1.78472 | 25.68 | 11.7 | S-TIH11(OHARA) |
| 11 | 27.147 | 7.61 | 1.80400 | 46.58 | 13.5 | S-LAH65V(OHARA) |
| 12 | −24.885 | 0.20 | | | 15.6 | |
| 13 | 36.657 | 3.34 | 1.83481 | 42.72 | 16.8 | S-LAH55V(OHARA) |
| 14 | −124.331 | 2.50 | | | 16.9 | |
| 15 | 81.208 | 1.25 | 1.69895 | 30.13 | 16.7 | S-TIM35(OHARA) |
| 16 | 17.217 | 1.27 | | | 16.4 | |
| 17 | 20.924 | 3.91 | 1.83481 | 42.72 | 17.0 | S-LAH55V(OHARA) |
| 18 | 117.559 | 10.75 | | | 16.8 | |
| 19 | ∞ | 0.75 | 1.51633 | 64.14 | | Fiter, etc. |
| 20 | ∞ | 1.00 | | | | |

<Variable Distance>
Data of a variable distance is shown in TABLE 8.

TABLE 8

| | Inf. | ×0.10 | ×0.20 |
|---|---|---|---|
| D14 | 2.50000 | 5.07593 | 7.65186 |

<Parameter Values in Conditional Expressions>
The parameter values in the respective conditional expressions are shown in TABLE 9.

TABLE 9

| f12/f | 1.01 |
|---|---|
| f/f3 | 0.06 |
| (R142 + R211)/(R142 − R211) | −0.37 |
| (R312 − R321)/(R312 + R321) | −0.10 |
| Da/D1 | 0.31 |
| f1_1/f1_2 | −1.63 |
| f1_2/f1_3 | 0.57 |
| (R131 − R142)/(R131 + R142) | 0.16 |
| f2/f1 | 0.25 |

Fourth Example f=25.00, F=1.81, 2ω=35.4 degrees
Data of the fourth example is shown in TABLE 10.

TABLE 10

| | R | D | N | ν | φ | GLASS |
|---|---|---|---|---|---|---|
| 1 | 150.000 | 1.40 | 1.60342 | 38.03 | 20.7 | S-TIM5(OHARA) |
| 2 | 17.575 | 5.62 | | | 19.0 | |
| 3 | 26.712 | 4.39 | 1.83481 | 42.72 | 19.2 | S-LAH55V(OHARA) |
| 4 | −47.190 | 0.20 | | | 18.6 | |
| 5 | 16.624 | 4.21 | 1.83400 | 37.16 | 15.3 | S-LAH60(OHARA) |
| 6 | 26.327 | 1.58 | | | 13.2 | |
| 7 | 992.053 | 1.00 | 1.69895 | 30.13 | 12.6 | S-TIM35(OHARA) |
| 8 | 12.801 | 3.00 | | | 11.5 | |
| 9 | 0.000 | 5.51 | | | 11.3 | |
| 10 | −26.208 | 1.20 | 1.69895 | 30.13 | 12.9 | S-TIM35(OHARA) |
| 11 | 21.482 | 6.22 | 1.59522 | 67.73 | 14.3 | S-FPM2(OHARA) |
| 12 | −22.079 | 0.20 | | | 16.0 | |
| 13 | 38.009 | 4.00 | 1.78800 | 47.37 | 18.0 | S-LAH64(OHARA) |
| 14 | −48.372 | 3.30 | | | 18.2 | |
| 15 | 34.135 | 1.59 | 1.60342 | 38.03 | 17.8 | S-TIM5(OHARA) |
| 16 | 14.848 | 0.69 | | | 17.1 | |
| 17 | 18.204 | 3.26 | 1.78800 | 47.37 | 17.2 | S-LAH64(OHARA) |
| 18 | 42.236 | 10.87 | | | 16.8 | |
| 19 | ∞ | 0.75 | 1.51633 | 64.14 | | Filter, etc. |
| 20 | ∞ | 1.00 | | | | |

<Variable Distance>
Data of the variable distance is shown in TABLE 11.

TABLE 11

| | Inf. | ×0.10 | ×0.20 |
|---|---|---|---|
| D14 | 3.30000 | 6.24078 | 9.18156 |

<Parameter Values in Conditional Expressions>
The parameter values in the respective conditional expressions are shown in TABLE 12.

TABLE 12

| f12/f | 1.08 |
|---|---|
| f/f3 | 0.08 |
| (R142 + R211)/(R142 − R211) | −0.34 |
| (R312 − R321)/(R312 + R321) | −0.10 |
| Da/D1 | 0.31 |
| f1_1/f1_2 | −1.58 |
| f1_2/f1_3 | 0.46 |
| (R131 − R142)/(R131 + R142) | 0.13 |
| f2/f1 | 0.22 |

Figure 5:
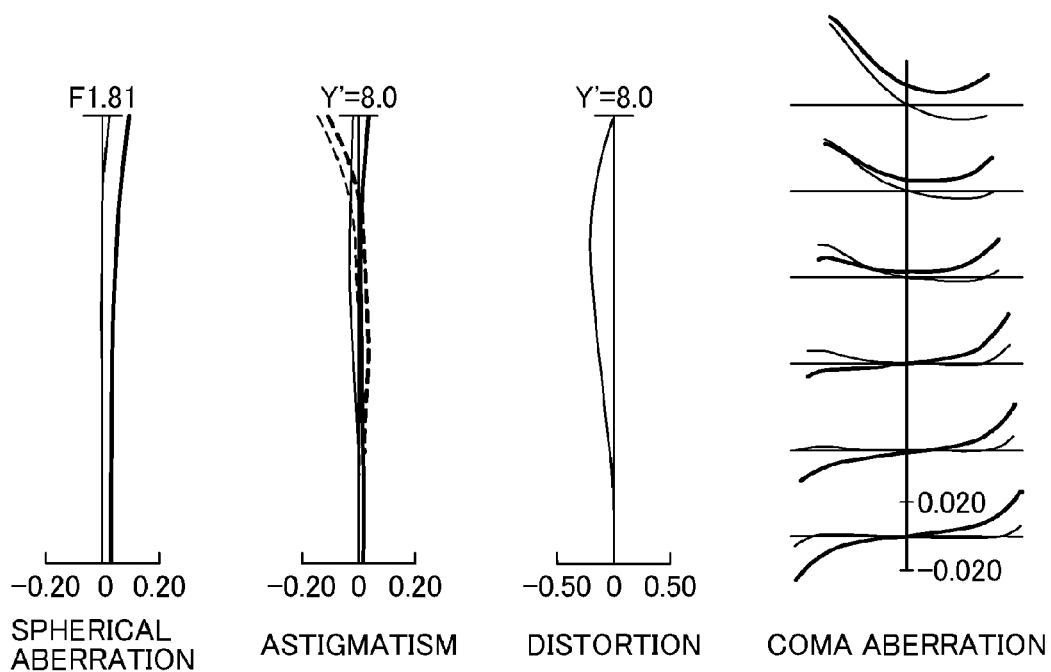
FIG. 5 is a diagram illustrating aberrations of the image forming lens according to the first example in a state that focusing is performed on an infinite distance object.
Figure 6:
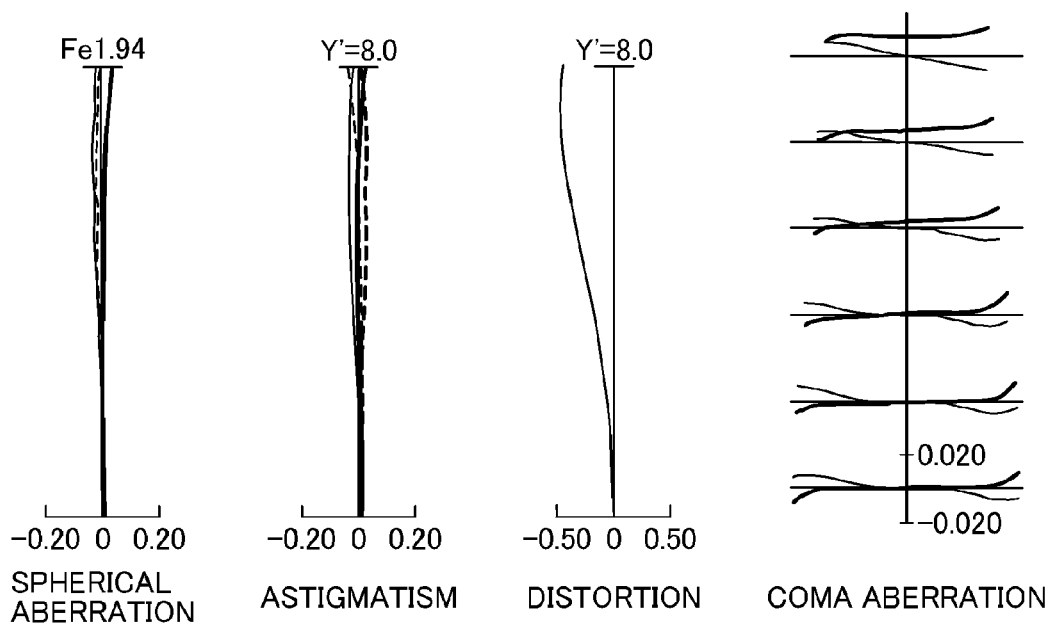
FIG. 6 is a diagram illustrating aberrations of the image forming lens according to the first example in a state that focusing is performed on an object with an imaging magnification of −0.1 times.
Figure 7:
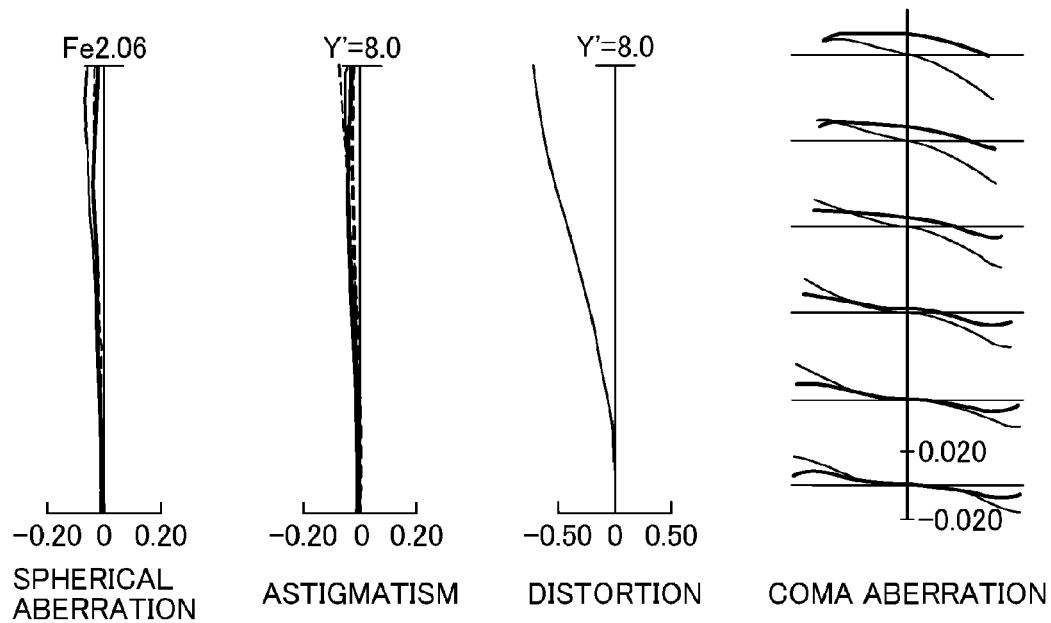
FIG. 7 is a diagram illustrating aberrations of the image forming lens according to the first example in a state that focusing is performed on an object with an imaging magnification of −0.2 times.

FIGS. 5 to 7 are diagrams illustrating aberrations related to the first example.

FIG. 5 is the diagram illustrating aberrations in a state that focusing is performed on an infinite distance object, FIG. 6 is the diagram illustrating aberrations in a state that focusing is performed on an object with an imaging magnification of −0.1 times, and FIG. 7 is the diagram illustrating aberration in a state that focusing is performed on an object with an imaging magnification of −0.2 times.

Figure 8:
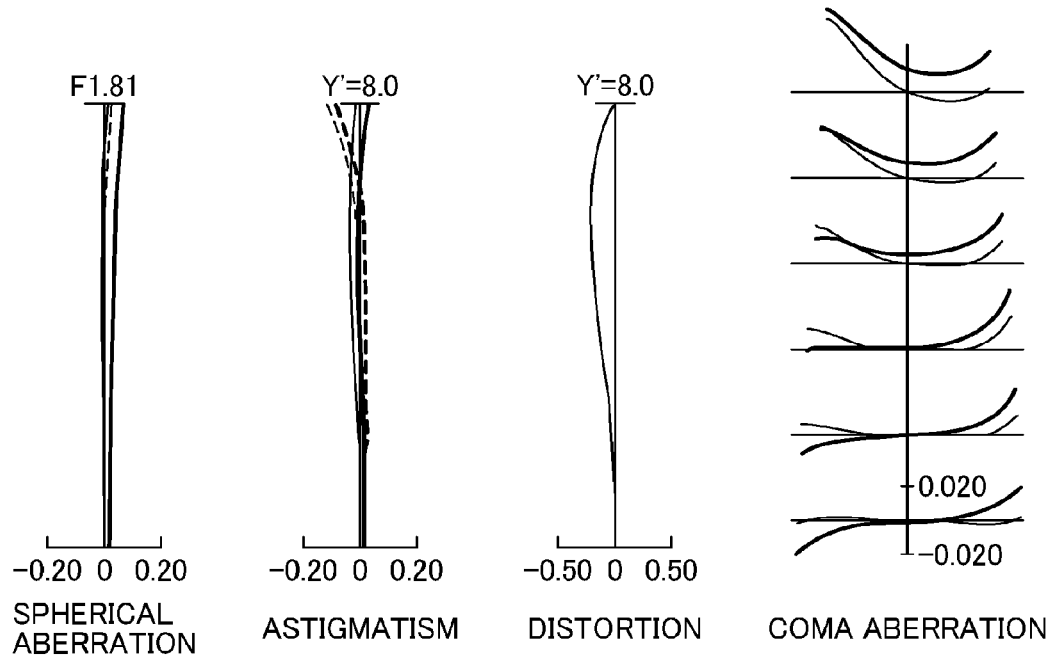
FIG. 8 is a diagram illustrating aberrations of the image forming lens according to the second example in a state that focusing is performed on an infinite distance object.
Figure 9:
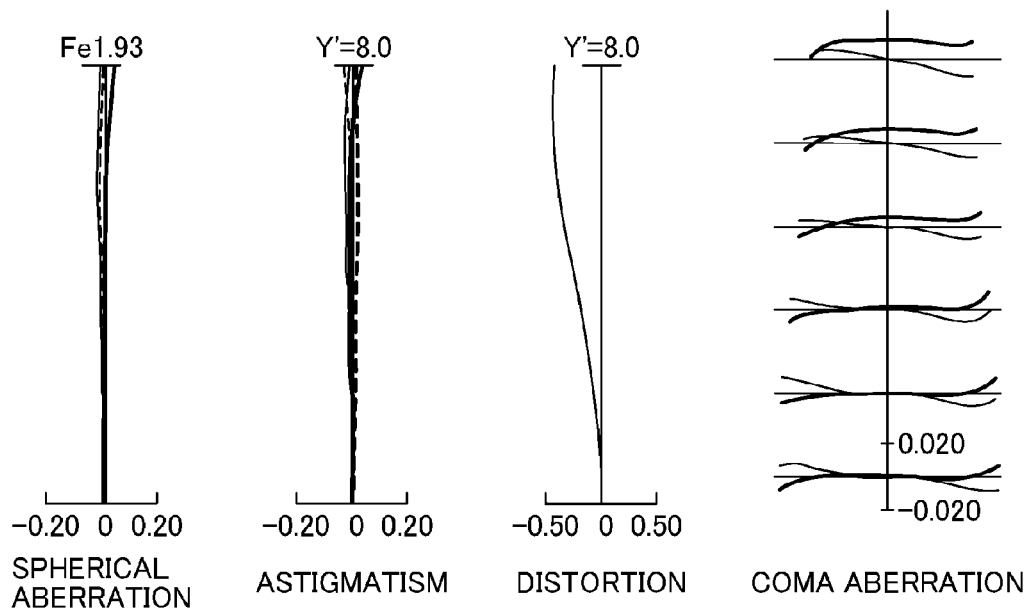
FIG. 9 is a diagram illustrating aberrations of the image forming lens according to the second example in a state that focusing is performed on an object with an imaging magnification of −0.1 times.
Figure 10:
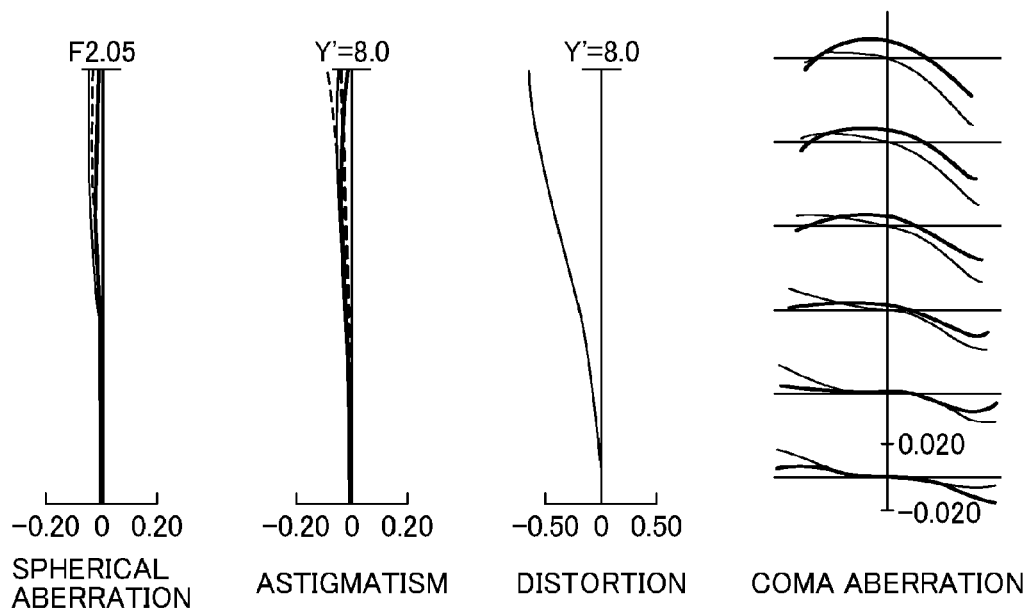
FIG. 10 is a diagram illustrating aberrations of the image forming lens according to the second example in a state that focusing is performed on an object with an imaging magnification of −0.2 times.

FIGS. 8 to 10 are diagrams illustrating aberrations related to the second example.

FIG. 8 is the diagram illustrating aberrations in a state that focusing is performed on an infinite distance object, FIG. 9 is the diagram illustrating aberrations in a state that focusing is performed on an object with an imaging magnification of − 0.1 times, and FIG. 10 is the diagram illustrating aberration in a state that focusing is performed on an object with an imaging magnification of −0.2 times.

Figure 11:
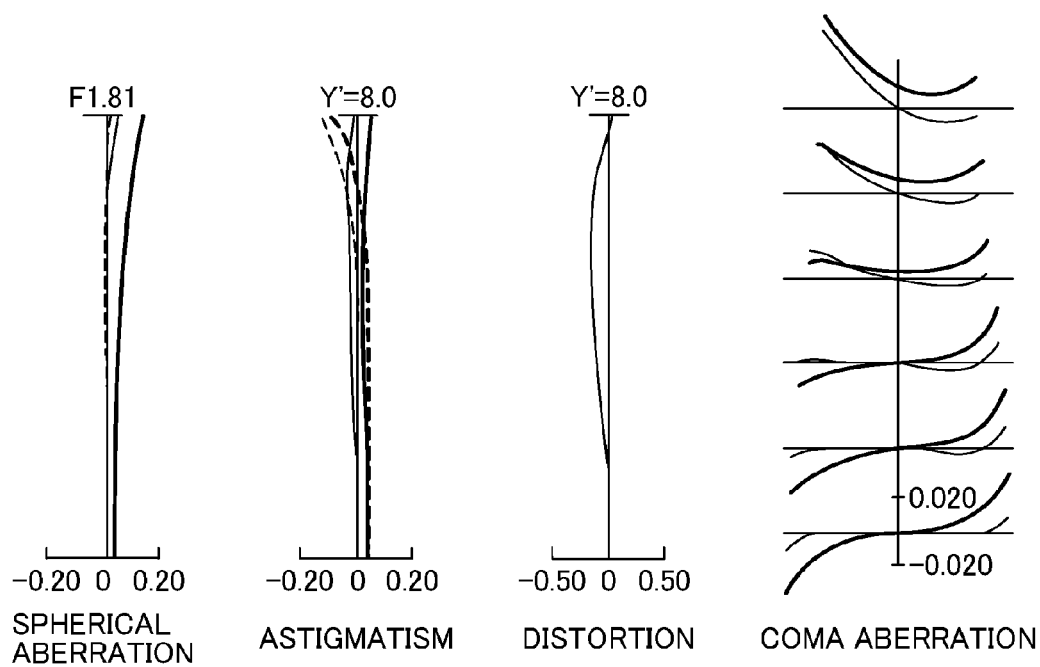
FIG. 11 is a diagram illustrating aberrations of the image forming lens according to the third example in a state that focusing is performed on an infinite distance object.
Figure 12:
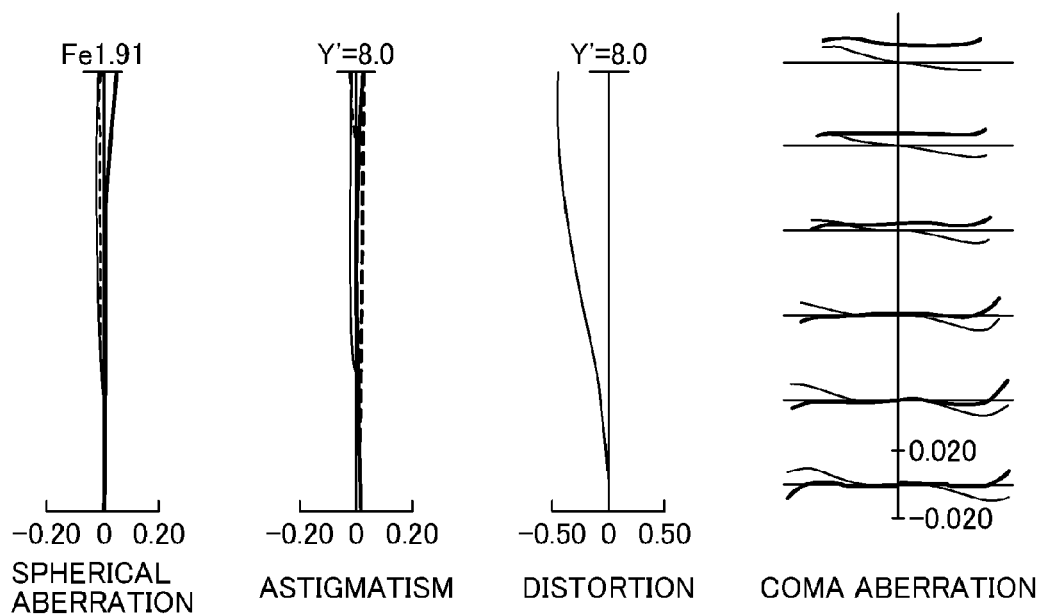
FIG. 12 is a diagram illustrating aberrations of the image forming lens according to the third example in a state that focusing is performed on an object with an imaging magnification of −0.1 times.
Figure 13:
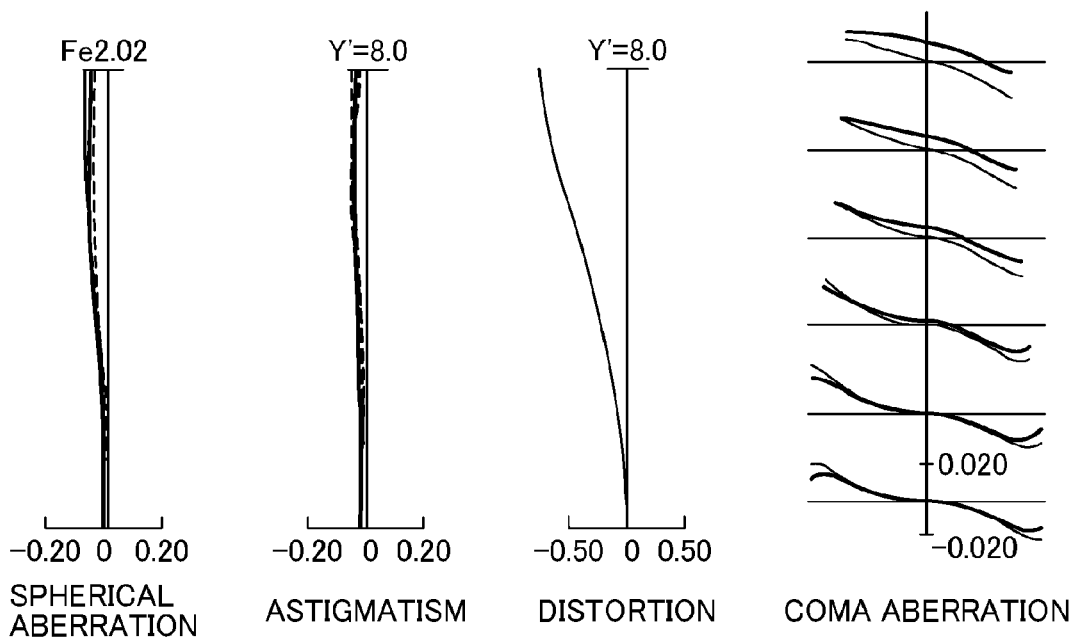
FIG. 13 is a diagram illustrating aberrations of the image forming lens according to the third example in a state that focusing is performed on an object with an imaging magnification of −0.2 times.

FIGS. 11 to 13 are diagrams illustrating aberrations related to the third example.

FIG. 11 is the diagram illustrating aberrations in a state that focusing is performed on an infinite distance object, FIG. 12 is the diagram illustrating aberrations in a state that focusing is performed on an object with an imaging magnification of −0.1 times, and FIG. 13 is the diagram illustrating aberration in a state that focusing is performed on an object with an imaging magnification of −0.2 times.

Figure 14:
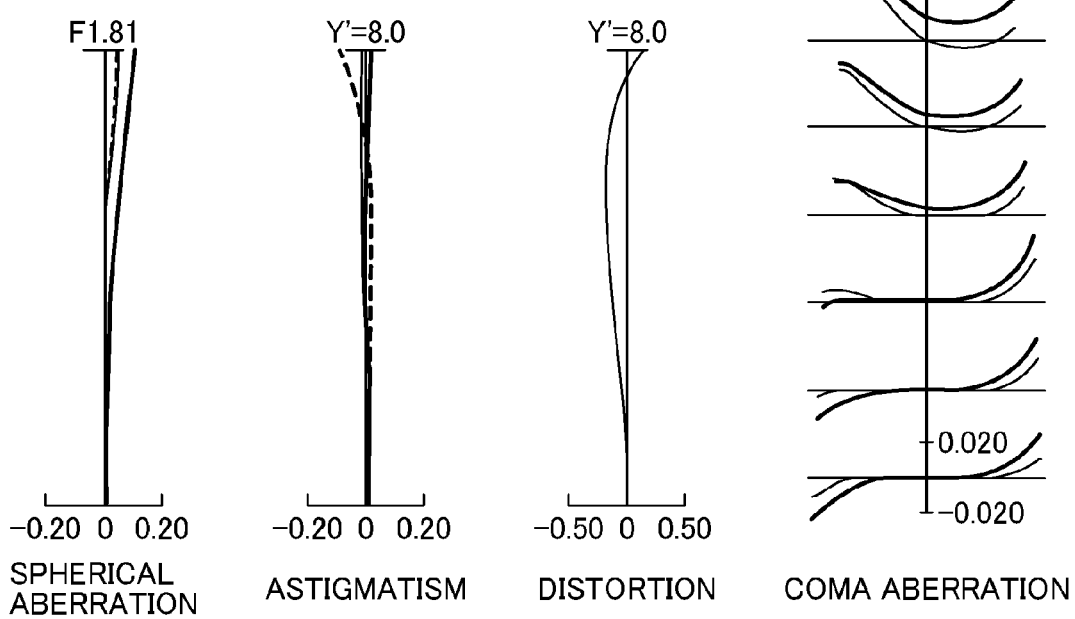
FIG. 14 is a diagram illustrating aberrations of the image forming lens according to the fourth example in a state that focusing is performed on an infinite distance object.
Figure 15:
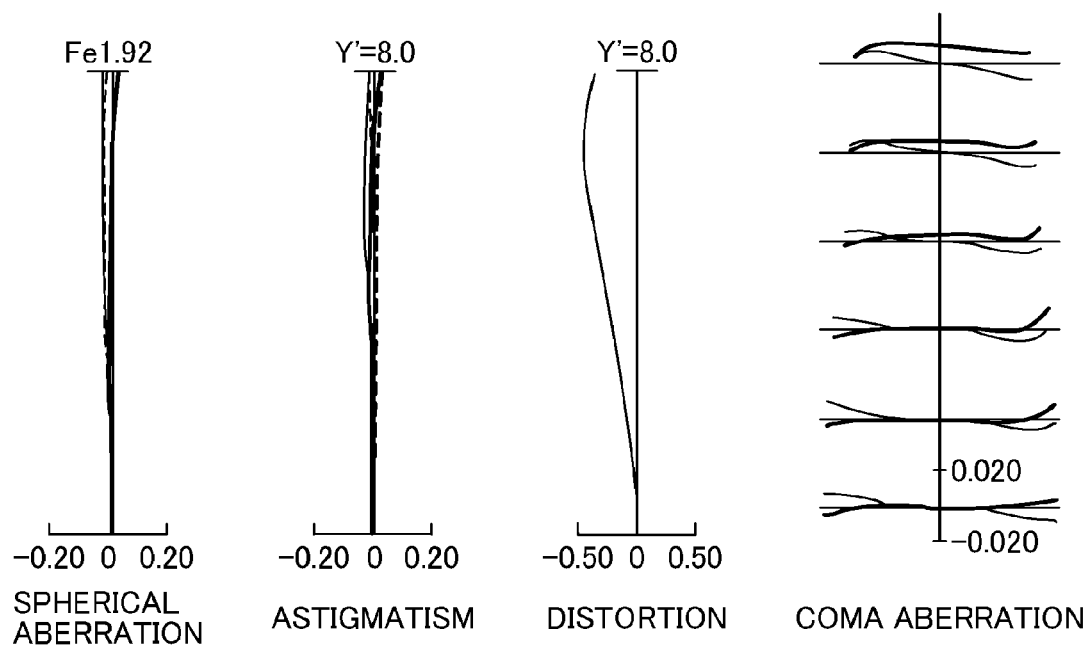
FIG. 15 is a diagram illustrating aberrations of the image forming lens according to the fourth example in a state that focusing is performed on an object with an imaging magnification of −0.1 times.
Figure 16:
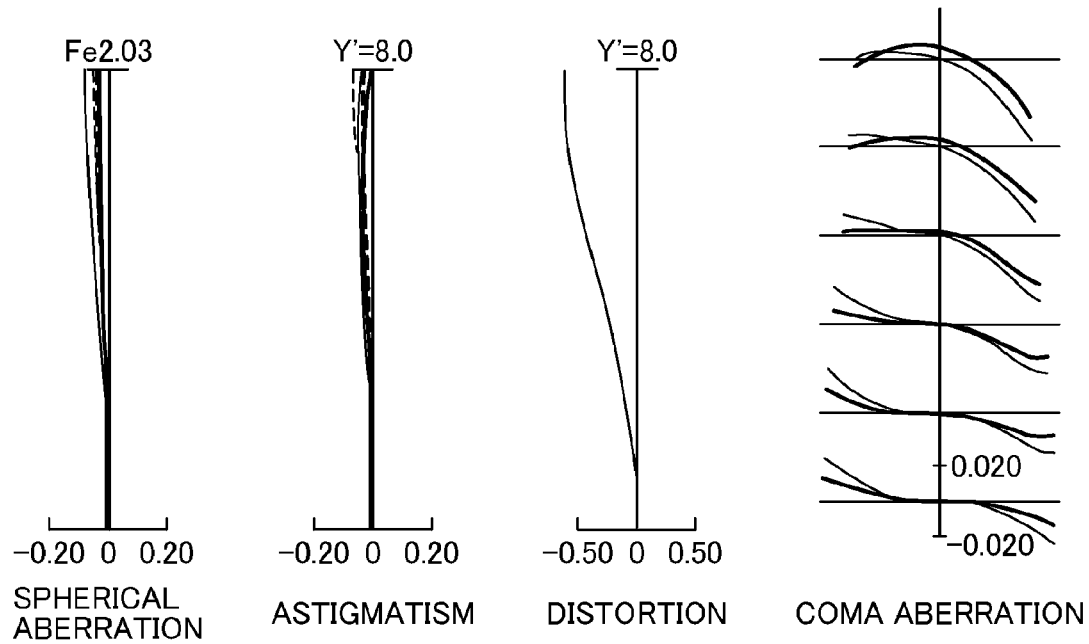
FIG. 16 is a diagram illustrating aberrations of the image forming lens according to the fourth example in a state that focusing is performed on an object with an imaging magnification of −0.2 times.

FIGS. 14 to 16 are diagrams illustrating aberrations related to the fourth example.

FIG. 14 is the diagram illustrating aberrations in a state that focusing is performed on an infinite distance object, FIG. 15 is the diagram illustrating aberrations in a state that focusing is performed on an object with an imaging magnification of −0.1 times, and FIG. 16 is the diagram illustrating aberration in a state that focusing is performed on an object with an imaging magnification of −0.2 times.

In these diagrams of aberrations, dotted lines in the spherical aberration diagrams indicate "sine conditions", and in the diagrams of astigmatism, solid lines indicate "sagittal" and dotted lines indicate "meridional".

Further, in these diagrams of aberration, "thin lines indicate d lines" and "thick lines indicate g lines".

In all of the respective examples, the aberrations are corrected at a high level, and the spherical aberration and axial chromatic aberration are too small to be a problem. Astigmatism, field curvature, and a chromatic aberration of magnification are also small enough, and a coma aberration and disorder of color differences thereof are also well suppressed up to outermost peripheral portions.

In the case of magnification of −0.1 times, an absolute value of distortion is also about 0.5%. By configuring the image forming lens like the present invention, excellent imaging performance can be ensured while having a wide field angle of about 35 degrees and an enlarged aperture such as F number of about 1.8.

Therefore, the image forming lens according to the present invention can achieve resolving power supporting an image sensor of 6 million to 10 million pixels, and can provide high performance from the infinite distance object to the short distance object with high contrast from the widely-opened stop without any collapse of point images up to peripheral portions of the field angle while being capable of capturing a straight line as a straight line without any distortion.

Further, in all of the respective examples, variation of performance (change of aberration) due to focusing is suppressed in a favorable manner.

An exemplary system of an "image input device for machine vision" using an image capturing device will be described based on FIG. 17.

Figure 17:
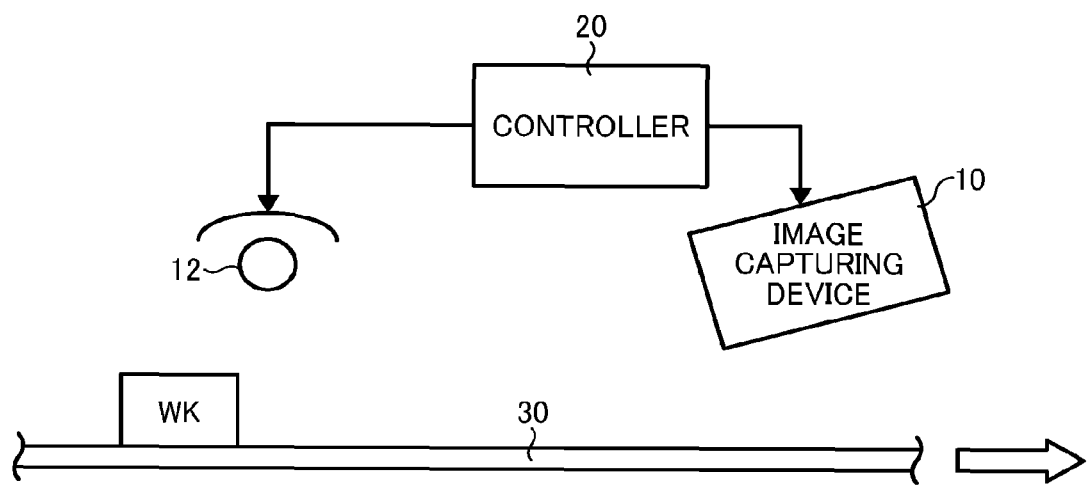
FIG. 17 is a diagram illustrating a system of an image capturing device according to one embodiment.

This "system" is used to perform product inspection, and an image of a work WK is captured and input as an image by an image capturing device 10 while the work WK is conveyed rightward of FIG. 17 as an inspection object by a conveyer 30.

For the image capturing device 10, an image forming lens recited in any one of claims 1 to 8, for example, any one of those described in the first to fourth examples is used.

A controller 20 formed as a computer, a central processing unit (CPU), or the like controls driving of the conveyer 30 and blinking of a lighting system 12, and also controls "focusing of an image forming lens and image capturing by an image sensor" inside the image capturing device 10.

As the work WK, products in various sizes are inspected, and the controller 20 specifies an appropriate working distance (imaging magnification) in accordance with the size of the work WK, and controls focusing of the image forming lens in accordance with the specified working distance.

As described above, according to the present invention, the image forming lens that includes a three-lens group structure and has little variation of performance due to focusing can be provided. Further, the image capturing device using this image forming lens can be provided.

While preferred working examples of the present invention have been described above, the present invention is not limited to the above specific embodiment, and various kinds of modifications and changes can be made in a scope of the gist of the present invention recited in the claims, unless otherwise specified in the above description.

More specifically, the image forming lens of the present invention can be applied not only to the image input device for machine vision but also to a digital camera, a video camera, a monitoring camera, and so on.

The effects according to the working examples of the present invention are merely exemplary preferred effects brought by the present invention, and the effects brought by the present invention are not limited to "those recited in the working examples".

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An image forming lens comprising a sequential arrangement of, from an object side to an image side, a first lens group having positive power, an aperture stop, a second lens group having positive power, and a third lens group having positive power, the image forming lens being configured to perform focusing from an infinite distance object to a short distance object by integrally moving the first lens group and the second lens group to the object side so as to increase a distance between the second lens group and the third lens group, wherein the first lens group comprises a sequential arrangement of four lenses with no intervening lens from the object side to the image side in order of a negative lens, a positive lens, a positive lens, and a negative lens having a concave surface on the image side, the second lens group comprises a sequential arrangement of three lenses with no intervening lens from the object side to the image side in order of a negative lens having a concave surface on the object side, a positive lens, and a positive lens, the third lens group comprises a sequential arrangement of two lenses with no intervening lens from the object side to the image side in order of a negative lens and a positive lens, and following conditional expressions are satisfied:

$$0.95 < f12/f < 1.2 \quad (1),$$

$$0.0 < f/f3 < 0.2 \quad (2), \text{ and}$$

$$-0.5 < (R142+R211)/(R142-R211) < -0.2 \quad (3), \text{ where}$$

f is a focal length of an entire system, f12 is a composite focal length of the first lens group and the second lens group, f3 is a focal length of the third lens group, R142 is a curvature radius of an image-side surface of the negative lens closest to the image side in the first lens group, and R211 is a curvature radius of an object-side surface of the negative lens closest to the object side in the second lens group.

2. The image forming lens according to claim 1, wherein the third lens group is fixed relative to an image surface when focusing is performed from the infinite distance object to the short distance object.

3. The image forming lens according to claim 1, wherein an image-side surface of the negative lens in the third lens group is a concave surface, an object-side surface of the positive lens in the third lens group is a convex surface, and a conditional expression (4) is satisfied:

$$-0.2 < (R312-R321)/(R312+R321) < -0.05 \quad (4), \text{ where}$$

R312 is a curvature radius of the image-side surface of the negative lens in the third lens group, and R321 is a curvature radius of the object-side surface of the positive lens in the third lens group.

4. The image forming lens according to claim 1, wherein a conditional expression (5) is satisfied:

$$0.20 < Da/D1 < 0.40 \quad (5), \text{ where}$$

Da is an air space between the object-side negative lens and the object-side positive lens in the first lens group, and D1 is a distance from a lens surface closest to the object side to a lens surface closest to the image side in the first lens group.

5. The image forming lens according to claim 1, wherein a conditional expression (6) is satisfied:

$$-2.0 < f1\_1/f1\_2 < -1.0 \quad (6), \text{ where}$$

f1_1 is a focal length of the object-side negative lens in the first lens group, and f1_2 is a focal length of the object-side positive lens in the first lens group.

6. The image forming lens according to claim 1, wherein a conditional expression (7) is satisfied:

$$0.3 < f1\_2/f1\_3 < 0.7 \quad (7), \text{ where}$$

f1_2 is the focal length of the object-side positive lens in the first lens group, and f1_3 is a focal length of the image-side positive lens in the first lens group.

7. The image forming lens according to claim 1, wherein a conditional expression (8) is satisfied:

$$0.1 < (R131-R142)/(R131+R142) < 0.2 \quad (8), \text{ where}$$

R131 is a curvature radius of an object-side surface of the image-side positive lens in the first lens group, and R142 is a curvature radius of an image-side surface of the image-side negative lens in the first lens group.

8. The image forming lens according to claim 1, wherein a conditional expression (9) is satisfied:

$$0.1 < f2/f1 < 0.3 \quad (9), \text{ where}$$

f1 is a focal length of the first lens group, and f2 is a focal length of the second lens group.

9. An image capturing device comprising the image forming lens according to claim 1.

* * * * *